Patented July 15, 1952

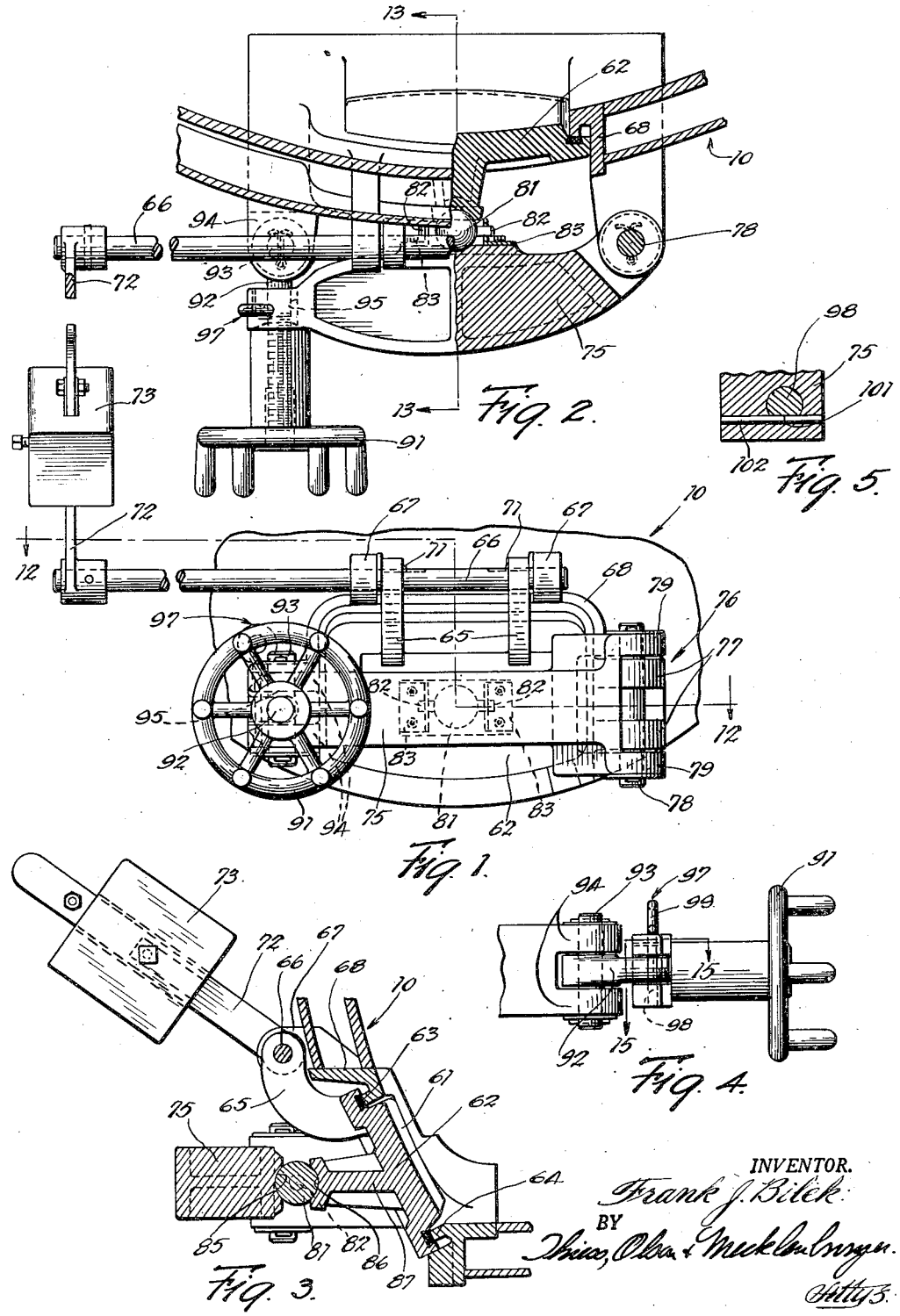

2,603,381

UNITED STATES PATENT OFFICE 2,603,381

CLOSURE FASTENER FOR PRESSURE VESSELS

Frank J. Bilek, Chicago, Ill., assignor to The Globe Company, Chicago, Ill., a corporation of Illinois Application December 6, 1946, Serial No. 714,542

2 Claims. (Cl. 220—55)

This invention relates to apparatus used in meat-processing plants for rendering the fat from animal matter, usually inedible matter. More specifically it has reference to a so-called "dry rendering cooker" in the form of a vessel having a hollow wall, into which steam is admitted for heating the contents of the vessel to render out the fat, the resultant liquid fat or grease and residual solids being tapped off or drained through suitable openings, whereafter the solids, known as cracklings, are separated from the liquid part in a percolator.

In order that the contents of the cooker—bones, entrails, and other animal matter—shall be subjected to uniform heating and to shorten the process, the vessel is equipped with a shaft carrying paddles designed to agitate the material, the shaft being carried in bearings mounted on the vessel, and stuffing boxes being provided to seal the shaft with respect to the vessel. The shaft is rotated in any conventional manner.

Cookers of the type to which the present invention relates are provided with a cock through which the liquid fat may be drained off at intervals. However, due to the residual solid matter, i. e., cracklings, accumulated in the lower part of the vessel, it is not possible to empty the vessel through the valve, and a door is provided for this purpose. Prior doors were hinged at one side, so that upon opening thereof, the hot fat and cracklings would gush to one side and spill over the pan of the percolator. Furthermore no positive provision was made, upon release of the locking bolt, for preventing sudden opening of the door by pressure of the contents within, and as a result the danger of serious injury to the attendant from the hot fat was always present.

Accordingly, a further object of the invention is the provision of a discharge door hinged at its top edge in order to direct the outflowing material downwardly into the percolator pan.

Another object is to provide safety means in connection with the door-locking bolt which will permit slight opening of the door for relieving the pressure, the safety means thereafter being disengageable to allow full opening of the door, and by which means the attendant is safeguarded against injury.

In carrying out my invention in one form, I provide a horizontal cylindrical vessel having a hollow wall into which steam is fed for cooking the mass of material. To each end outer wall is secured a bracket having an inverted cantilever form, and to the free end of each bracket is secured a pillow block. Each of the two stuffing boxes through which the horizontally disposed agitator paddle shaft extends to the exterior of the vessel is positioned below a bracket in order that all of the external part of the box is exposed. In other aspects the invention embodies a paddle construction including a portion by which the paddle is secured to the shaft, and an agitating shoe having a V-shaped portion for cleaving the mass of material with minimum friction and maximum agitating effect while the shaft is rotated in one sense, and an arcuately formed camming portion for forcing the cooked material toward the discharge door upon opposite rotation of the shaft. In still another aspect the invention includes a discharge door for emptying the vessel characterized by a safety feature, the same comprising a locking bar and bolt together with a pin, which will allow partial opening of the door for preliminarily relieving the pressure of the outflowing material, whereafter the pin may be shifted to allow the bolt and bar to be moved for full opening of the door. Moreover, the door is hinged at the top to direct the discharging material downwardly into the percolator.

In the drawings, which show one way in which the invention may be embodied in practice:

Fig. 1 is a front elevational view of the discharge door of a cooker and associated mechanism;

Fig. 2 is a combined plan view and cross section taken on the line 2—2 of Fig. 1;

Fig. 3 is a cross-sectional view taken on the line 3—3 of Fig. 2;

Fig. 4 is a detail of the door handle and locking pin; and

Fig. 5 is a cross-sectional detail view of the safety locking pin taken on the line 5—5 of Fig. 4.

In some of the figures parts have been broken away or omitted for clarity.

Referring to the drawings, there is shown a door construction associated with one end of a cooker preferably comprising a double walled cylindrical vessel 10. The material to be treated is placed in the vessel and heated to render out the fat. The resultant liquid fat or grease with residual solids is then drawn off. Thereafter the residue consisting of solid matter together with some liquid may be discharged through a suitable opening 61 in the front end of the drum 10. This opening is normally closed by a door 62 having a lead gasket 63 for engaging the rim 64 of the opening to seal the joint.

The door 62 is pivotally supported by means of integral ears 65 on a shaft 66 carried in lugs 67 forming part of the door frame 68, the ears 65 being keyed to the shaft as shown at 71. Shaft 66 extends to the left or right (in this instance to the left) and fixedly carries the arm 72 supporting the counterweight 73 adjustably secured thereto, and by means of which the door when unlocked may swing inwardly to facilitate locking thereof. After the door is unlocked in the manner to be described, the arm 72 may be used as a handle to open the door while the operator stands in a safe position to one side of the cooker and away from the hot discharge.

To lock the door, a swingable bar 75 of heavy ribbed construction is provided, the hinge being shown at 76, the latter including ears 77 extending from the frame 68 through which a pintle 78 extends, and the ears 79 of the bar 75 rotating thereon. At its center the bar 75 supports a spherical member 81 having the diametrically opposed studs 82 protruding therefrom, the latter being carried in the brackets 83 secured to the bar 75. Member 81 is arranged to seat in spherical depressions 85 and 86 in the bar 75 and in integral post 87 of the door 62, respectively (Fig. 13). Consequently, when the door is closed and bar 75 in locking position, closing force exerted by the bar is transmitted through the member 81 to seat the door 62 over the entire periphery of the gasket 63, the ball joint including the member 81 allowing the door to swivel freely to fullseated position. In this connection it is to be noted that sufficient play will be allowed between the shaft 66 and the apertures therefor in the lugs 67 so as not to interfere with free seating of the door 62.

Bar 75 is drawn to closing position by means of the handwheel 91 engaging the eyebolt 92, the latter being swingable on the pintle 93 carried in the ears 94 projecting from the door frame 68. Bar 75 has a U-shaped slot 95 into which the eyebolt 92 may be swung, whereupon tightening of the handwheel 91 secures the door 62 tightly on its seat.

It will be obvious from the foregoing that when the handwheel 91 has been loosened, it, together with the eyebolt 92, may be swung outwardly. However, when a charge or portion thereof is exerting pressure against the door, there is the hazard, after the handwheel has been loosened, of the door being forced open and with consequent serious injury to the operator. To insure against an accident of this kind, I provide a safety pin 97 comprising a shank 98 (Fig. 14) and a handle 99, one side of the shank being flattened as at 101 and slidable against a pin 102 pressed into the bar 75, the flattened portion terminating just short of the bottom end of the shank 98 to prevent the pin 97 from being fully withdrawn and perhaps lost. When pin 97 is in its downward position, eyebolt 92 cannot be swung outwardly, and when the pin is raised by an independent effort on the part of the operator, the bolt 92 may be freely moved. After the bolt is outwardly of the door, pin 97 may drop downwardly into normal position, thus preventing the bolt from being returned to locking position. Accordingly, when locking the door, the operator must consciously lift the pin 97, swing eyebolt 92 into locking position, and then move pin 97 to lock the bolt.

From the foregoing it will have been noted that I have provided a dry rendering cooker having many advantages over those presently available. By providing a discharge door which is subjected to closing pressure at its center through the medium of a ball, proper sealing thereof over the entire periphery is assured, and by the use of the locking pin utmost safety is afforded the operator.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A closure for a pressure vessel comprising a door having one side hinged to said vessel about a longitudinal axis, a locking bar for being positioned transversely of the door hinged at one end to said vessel, a spherical member positioned intermediate the door and the bar, said spherical member having diametrically opposed studs, means for supporting said studs substantially parallel to said door axis, and a bolt for drawing the bar toward the door to force the same into closing position, said spherical member transmitting closing pressure from the bar to the door.

2. A closure for a pressure vessel comprising a door having one side hinged to said vessel about a longitudinal axis, a locking bar for being positioned transversely of the door having one end hinged to said vessel adjacent said door about an axis substantially normal to said first axis, a spherical member having diametrically opposed studs positioned intermediate the door and the bar, said door and bar having similarly positioned opposed rounded depressions, brackets for supporting said studs substantially parallel to said door axis, with said spherical member seated in one of said depressions for mating with the other depression to transmit closing pressure from the bar to the door, and a bolt for drawing the bar toward the door to force the same into closing position.

FRANK J. BILEK.

REFERENCES CITED

The following references are of record in the file of this patent:

UNITED STATES PATENTS

| Number | Name | Date |
|---|---|---|
| 124,768 | Snyder | Mar. 19, 1872 |
| 1,337,981 | Waggoner | Apr. 20, 1920 |
| 1,799,906 | Jacobs | Apr. 7, 1931 |
| 2,018,156 | Tolman, Jr. | Oct. 22, 1935 |
| 2,446,779 | McMullen | Aug. 10, 1948 |

FOREIGN PATENTS

| Number | Country | Date |
|---|---|---|
| 102,378 | Australia | Oct. 28, 1937 |